April 4, 1961 T. J. GRYPMA 2,978,271
STORAGE BATTERY CARRIER
Filed Nov. 6, 1957 2 Sheets-Sheet 1

INVENTOR.
Theodore J. Grypma
BY
ATTORNEYS

April 4, 1961  T. J. GRYPMA  2,978,271
STORAGE BATTERY CARRIER
Filed Nov. 6, 1957  2 Sheets-Sheet 2

INVENTOR.
Theodore J. Grypma
BY
Price and Heneveld
ATTORNEYS

United States Patent Office 2,978,271
Patented Apr. 4, 1961

2,978,271
STORAGE BATTERY CARRIER
Theodore J. Grypma, P.O. Box 28, Grand Rapids, Mich.
Filed Nov. 6, 1957, Ser. No. 694,878
3 Claims. (Cl. 294—92)

This invention relates to storage battery carrying means generally and more particularly to battery terminal post clamps for use with storage battery carrying straps.

The most commonly known and used means of removing a storage battery from its rack within a vehicle or elsewhere and for carrying it from one place to another, is a simple strap member having clamp means on each end thereof which are readily attached to the terminal posts of the storage battery. Such clamp means are preferably readily attachable and detachable from the terminal posts, securely engage the posts when engaged therewith, will not slip off or creep up the posts, are usable with all size posts including those which are worn, are easily manipulated, and are as simple to assemble and as inexpensive to manufacture as is possible.

All of the aforementioned advantages are present in the storage battery terminal post clamp device here proposed as well as other advantages which will become more apparent from the description of such a clamp device which follows.

Figure 1:
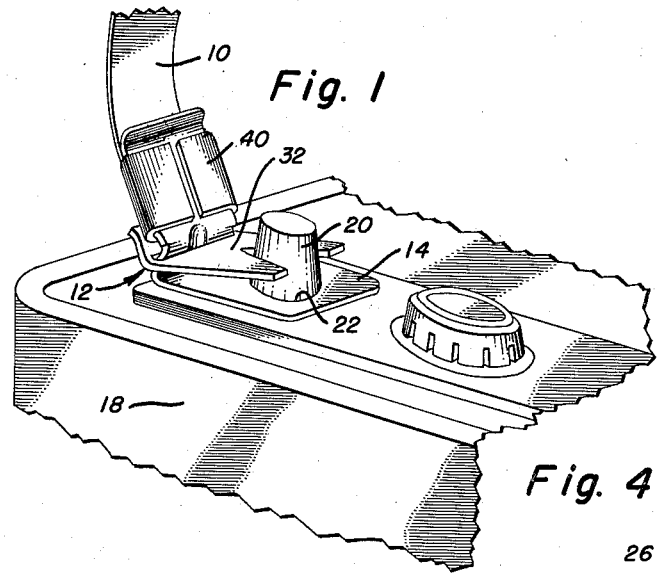
Fig. 1 is a perspective view of a part of a storage battery showing one of the terminal post clamps of the proposed battery carrying means.

The proposed battery carrying means includes a carrying strap 10 having battery terminal post engaging clamps secured to each end thereof. Only one of such clamps is shown in the accompanying drawings since the clamps at each end of the strap are the same. Similarly, like reference numerals are used for like parts in the different figures of the drawings where applicable.

The battery terminal post clamp 12 of Figs. 1 through 4 includes a lower jaw member 14 formed from flat plate metal or the like and having one end 16 thereof formed to lie flat upon the upper surface of a storage battery 18 with the terminal post 20 thereof received through the terminal engaging access 22 provided therein. The other end 24 of the lower jaw member is disposed at an angle from the terminal post engaging end 16 thereof and is connected thereto by a goose-neck-like bend 26 including a bight 28 and a shoulder portion 30 formed by the upper edge of the bight.

Figure 4:
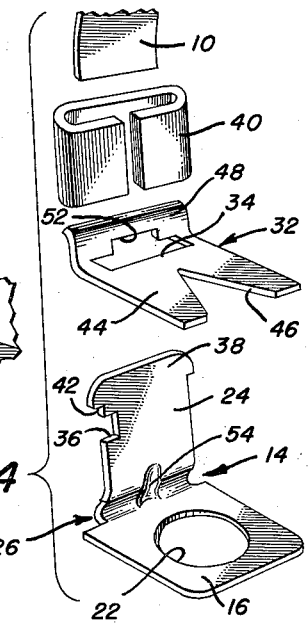
Fig. 4 is an exploded view of the proposed battery carrier showing the different parts thereof.

An upper jaw member 32 is pivotally received upon the lower jaw member 14 by means of an elongated slot 34 formed therein and received over the end 24 of the lower jaw member, which is narrower than the terminal post engaging end 16 as best seen in Fig. 4.

The end 24 of the lower jaw member includes a notch 36 with which the slot 34 of the upper jaw member is first engaged in being assembled with the lower jaw member in order to pass over the head 38 thereof which is as wide as the other end 16 of the lower jaw.

The carrying strap 10 is engaged with the back side of the upturned end 24 of the lower jaw member 14 and is held thereto by a strap clamp 40 engaged about the narrower part of the upturned end under the shoulders 42 of the head 38. The strap clamp also serves to displace part of the strap material within the notch 36 for greater strap retention.

The upper jaw member 32 includes a terminal post engaging end 44 having a V-cut 46 provided in the end thereof and has the other end 48 disposed at an angle to provide a thumb tab for disengaging the upper jaw member from the terminal post as will later be described.

The elongated slot 34 in the upper jaw member will be noted to be just about at the bend between the ends 44 and 48 thereof and to also include a notch 52 extending toward the thumb tab end 48. This notch is to accommodate the reinforcing rib 54 formed in the lower jaw member 14 at the bend therein.

Figure 2:
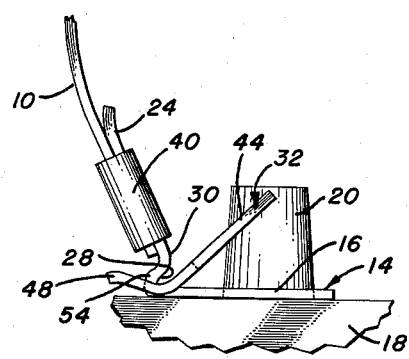
Fig. 2 is a side plan view of the storage battery terminal post clamp device shown in Fig. 1 as first engaged with such post.
Figure 3:
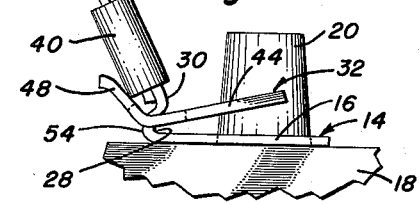
Fig. 3 is another side plan view of the battery terminal post clamp device shown in Fig. 1 as fully engaged with the terminal post thereof.

The operation of the terminal post clamp of Figs. 1 through 4 is as follows: The lower jaw member 14 receives the terminal post 20 through the access 22 and lies at the base of the post with the upper jaw member 32 pivotally disposed within the bight 28 of the gooseneck position thereof, as shown by Fig. 2. The upper jaw member, by its own weight or slight thumb pressure, becomes wedged between the upturned end 24 of the lower jaw, within the bight 28 thereof, and the terminal post 20 with the V-cut 46 thereof biting into the terminal post. This in turn causes the far edge of access 22 to be securely engaged with the opposite side of the terminal post to that engaged by the V-cut of the upper jaw member.

It will be quickly appreciated that any tendency of the lower jaw member 14 to be raised from its seat on the upper surface of the storage battery, as with a vertical force on the carrying strap 10, will mean a tendency of the lower jaw member to pivot about its point of contact with the far side of the terminal post. This in turn requires a lateral movement of the upper jaw member 32 toward or into tighter biting engagement with the battery terminal post since the upper jaw member is prevented from creeping vertically or moving other than toward the terminal post because of the shoulder and bight portions 30 and 28, respectively, with which it is engaged.

The clamp 12 is readily released from the terminal post 20 by depressing the thumb tab 48 to pivot the V-cut end 46 of the upper jaw member free of the post member.

Figure 5:
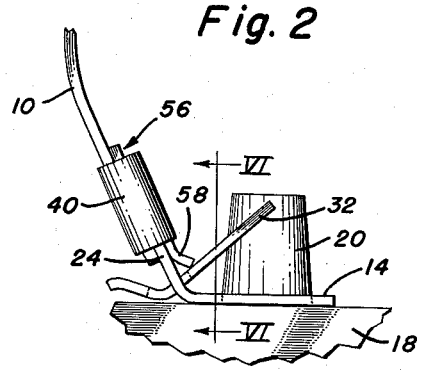
Fig. 5 is a side plan view of a modified battery terminal post clamp.
Figure 6:
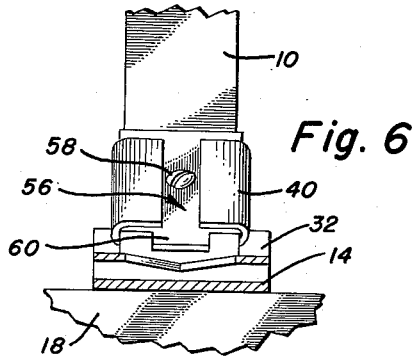
Fig. 6 is an end view of the battery terminal post clamp of Fig. 5 substantially in the plane of VI—VI and looking in the direction of the arrows thereon.

A stop tab or finger 56 may be used, as shown in Figs. 5 and 6, to provide a shoulder that prevents the jaw member 32 from creeping up on the upturned end 24. The stop member 56 is secured to the face of the strap receiving end 24 of the lower jaw member 14, under the edges of the strap clamp 40, as by a screw 58 and includes a tab end 60 disposed to engage and limit the terminal post engaging end 44 of the upper jaw member in its pivotal movement out of a post engaging position.

Figure 7:
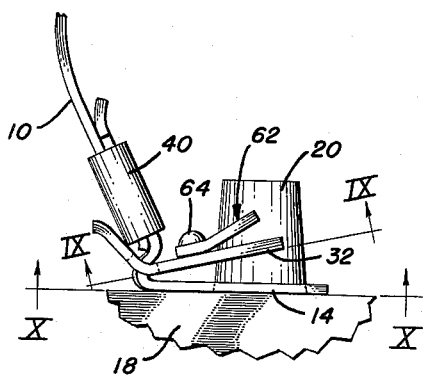
Fig. 7 is a further modification of the proposed type battery terminal post clamp engaged with a normal size terminal post.
Figure 8:
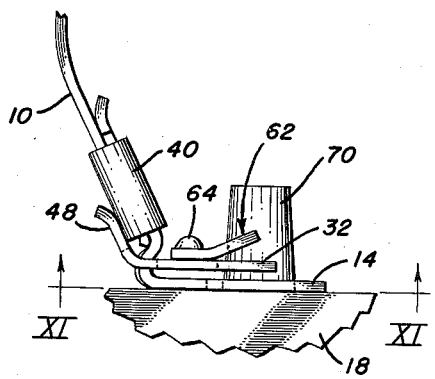
Fig. 8 shows the modified clamp means of Fig. 7 as engaged with an abnormally undersize battery terminal post.
Figure 9:
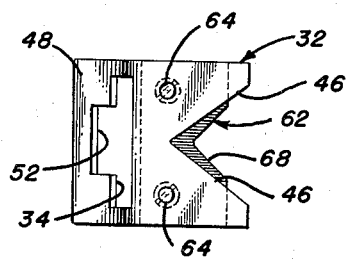
Fig. 9 is a cross sectional view of the underside of the upper jaw member above the clamp of Fig. 7 as seen in the plane IX—IX thereon, looking in the direction of the arrows.
Figure 11:
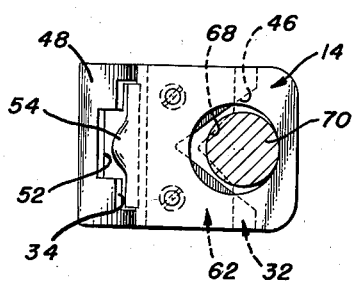
Fig. 11 is a bottom view of the clamp of Fig. 8 taken along the plane XI—XI thereon and looking in the direction of the arrows.

Figs. 7 and 8 show another modified terminal post clamp which includes a secondary upper jaw member 62 secured as by rivets 64 to the previously mentioned upper jaw member 32 and having the terminal post engaging end thereof extending at an angle to and over the jaw member 32. As evident from Figs. 7 and 9 the jaw member 62 has a V-cut 68 forming a post engaging end surface. The projection of this post engaging surface on the general plane IX—IX the jaw member 63 extends outwardly of the V-cut or gripping surface 46 (see Fig. 9). In other words the V-cut 68 of less depth than V-cut 46, in what is now the lowermost upper jaw member, is provided in the secondary jaw member in order to be able to engage a smaller terminal post, as post 70 of Figs. 8 and 11, which may be worn or for some other reason be undersized.

Figure 10:
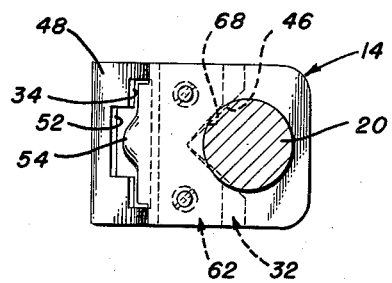
Fig. 10 is a bottom view of the clamp of Fig. 7 taken along the plane X—X thereon and looking in the direction of the arrows.

The uppermost jaw member 62 does not come into use with a regular size terminal post 20, as seen in Figs. 7 and 10, but with the smaller diameter post 70 in which the V-cut 46 of the regular upper jaw member 32 is too deep to engage such post, the uppermost jaw member will engage the smaller post and the clamping action of the proposed clamp device is the same as previously described.

Figure 12:
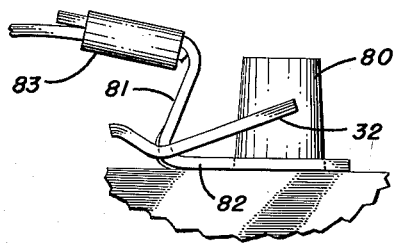
Fig. 12 is a side elevational view of a modified clamp.

Fig. 12 shows a modification in which the upturned end of the lower jaw comprises a portion 81 inclined to the end 82 a considerable distance toward the post 80 providing the shoulder which prevents vertical creep of the jaw 32. This inclined portion acts in the same manner as the shoulders of the other modifications thus maintaining the location of jaw 32, at the vertex between the portions 81 and 82. Portion 82 is connected to a horizontal portion 83 to which the strap 10 is connected in a similar manner to that previously described.

While I have described a preferred embodiment of this invention, it will be recognized that various other modifications may be made. Each of these modifications is to be considered as included in the hereinafter appended claims unless these claims by their language expressly state otherwise.

I claim:

1. A storage battery carrier comprising: a battery carrying strap having battery terminal post engaging clamps provided at opposite ends thereof; said clamps including upper and lower jaw members pivotally engaged together; said lower jaw member being formed to include a generally horizontal battery terminal post engaging end and a carrying strap engaging end angularly disposed upwardly relative to the terminal post engaging end; said battery terminal post engaging end having a post receiving aperture formed therein providing a gripping surface for engaging said post on at least one side thereof; said upper jaw member including a V-shaped elongated member having one leg formed to provide a battery post gripping surface end and the other leg angularly disposed relative to said one leg forming a release tab end; said V-shaped member having an aperture at the vertex of said legs, said aperture receiving the angularly disposed upwardly extending end of said lower jaw member for pivotally mounting said upper jaw member on said lower jaw member such that when in gripping position both the gripping surface end and release tab end extend upwardly from said horizontal battery post engaging end of the lower jaw member, the gripping surface end extending toward and spaced from the gripping surface of the lower jaw member and the release tab end extending in the opposite direction and on the other side of the said carrying strap engaging end of the lower jaw member, and means for limiting the upward creeping of said upper jaw member thereon.

2. A storage battery carrier comprising: a battery carrying strap having battery terminal post engaging clamps provided at opposite ends thereof; said clamps including upper and lower jaw members pivotally engaged together; said lower jaw member being formed to include a generally horizontal battery terminal post engaging end and a carrying strap engaging end angularly disposed upwardly relative to the terminal post engaging end; said battery terminal post engaging end having a post receiving aperture formed therein larger than a battery post and providing a gripping surface for engaging said post on at least one side thereof; said upper jaw member including a V-shaped elongated member having one leg formed to provide a battery post gripping surface end and the other leg angularly disposed relative to said one leg forming a release tab end; said V-shaped member having an aperture at the vertex of said legs, said aperture receiving the angularly disposed upwardly extending end of said lower jaw member for pivotally mounting said upper jaw member on said lower jaw member such that when in gripping position both the gripping surface end and release tab end extend upwardly from said horizontal battery post engaging end; a goosenecked bend on said upwardly extending end of said lower jaw member and received by the aperture of the V-shaped upper jaw member, said goosenecked bend providing a shoulder for limiting the upward creeping of said upper jaw member thereon and providing a cam surface which forces the gripping surface end of said upper jaw member toward the gripping surface of said lower jaw member.

3. A storage battery carrier comprising: a battery carrying strap having battery terminal post engaging clamps secured to the ends thereof, each of said clamps including upper and lower jaw members pivotally connected together at respective ends thereof and each having upper and lower faces, the respective other ends of said jaw members having gripping surfaces formed to respectively engage opposite sides of a battery terminal post, and a secondary upper jaw member fixedly secured to the upper face of said upper jaw member, said secondary upper jaw member having a post-engaging end surface spaced from said gripping surface of said upper jaw member in a direction away from said lower jaw member, the projection of said post-engaging end surface of said secondary upper jaw member on the general plane through the upper jaw member extending outwardly of the gripping surface of the upper jaw members.

References Cited in the file of this patent

UNITED STATES PATENTS

| | | |
|---|---|---|
| 2,181,400 | Goldman | Nov. 28, 1939 |
| 2,253,417 | Clark | Aug. 19, 1941 |
| 2,503,005 | Speaker | Apr. 4, 1950 |
| 2,503,794 | Brown | Apr. 11, 1950 |